May 21, 1974   R. D. LURIE   3,812,002
LAMINATE CONSTRUCTION
Filed Dec. 6, 1971
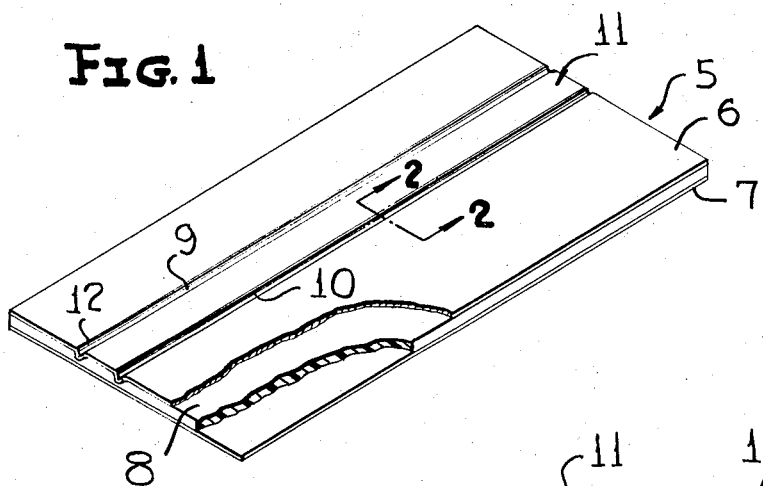
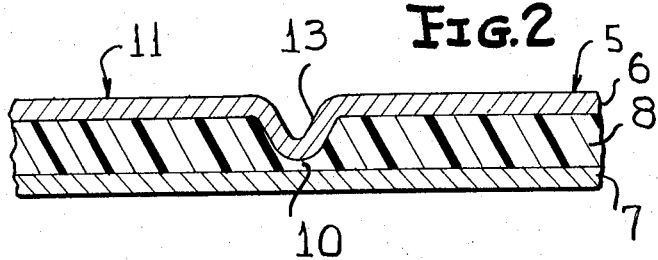
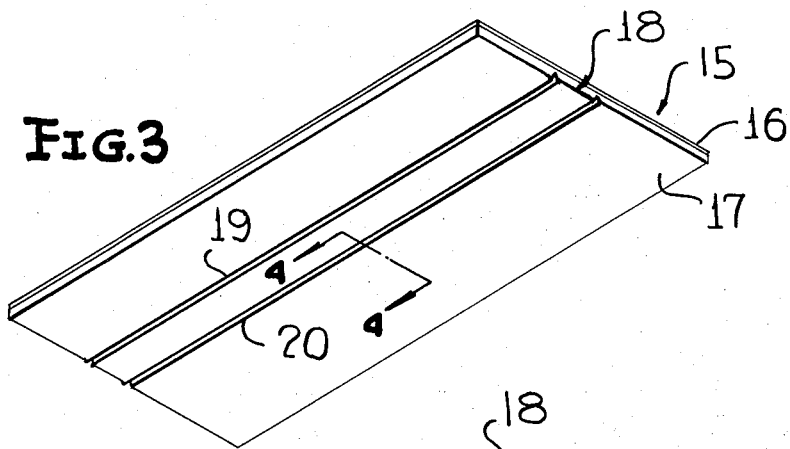
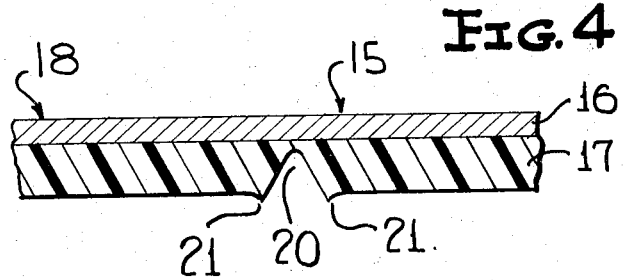
INVENTOR
RANDOLPH D. LURIE
BY
Mason, Porter, Diller & Stewart
ATTORNEYS United States Patent Office 3,812,002
Patented May 21, 1974

3,812,002
LAMINATE CONSTRUCTION
Randolph D. Lurie, Park Forest, Ill., assignor to Continental Can Company, Inc., New York, N.Y.
Continuation of abandoned application Ser. No. 379,650, July 1, 1964. This application Dec. 6, 1971, Ser. No. 205,283
Int. Cl. B32b 3/00
U.S. Cl. 161—119                   5 Claims

ABSTRACT OF THE DISCLOSURE

This disclosure relates to a novel method of forming a tear line in a laminate as well as the laminate per se and methodwise includes the steps of providing a tool having a heated edge, applying the heated edge to a laminate under pressure to effect a heating and flowing of a stiffening layer thereof, and effecting relative movement of the laminate and the tool along a predetermined line to form a weakening line in the stiffening layer.

Preferably though not necessarily the article is composed solely of a metal foil layer and a thermoplastic resin stiffening layer with the thermoplastic resin stiffening layer having a weakening line molded in the surface thereof remote from the foil layer.

---

The present patent is a continuation of commonly assigned U.S. Application No. 379,650, filed July 1, 1964, in the name of Randolph D. Lurie, entitled Laminate Construction, which is abandoned.

This invention relates in general to new and useful improvements in laminate constructions, and more particularly to a laminate of metal foil and plastic.

This invention particularly relates to a novel metal foil to plastic laminate which is suitable for use in the forming of containers, and which laminate may be readily torn along a desired line while prior to the tearing of the laminate, the integrity of the package is maintained.

A primary object of this invention is to provide a novel laminate which is suitable for use in the forming of packages wherein the laminate is formed of metal foil and plastic and wherein the packages may be readily opened by the tearing away of a predetermined portion of the material of the package.

Another object of this invention is to provide a novel laminate particularly adapted for the forming of packages wherein the laminate is readily tearable along predetermined lines the laminate being formed of metal foil and plastic and wherein the plastic is weakened along the predetermined lines while the metal foil remains undamaged.

Still another object of this invention is to provide a novel laminate of a metal foil and a plastic, the plastic being of the type wherein it may be readily heat weakened and the laminate having at least one line of weakening therealong which has been accomplished by heat weakening the plastic material along that line.

A further object of this invention is to provide a novel laminate which is formed of a metal foil and a plastic and wherein after the formation of the laminate, the plastic may be suitably scored leaving an exposed metal foil layer undamaged so that the laminate remains impervious and at the same time may be readily torn along the weakening line formed in the plastic.

Still another object of this invention is to provide a novel method of forming a laminate having a weakening line therein, the laminate being formed by bonding together a foil layer and a plastic layer, and utilizing a hot knife which is at a temperature sufficiently high to effect the fusing of the plastic but not hot enough to melt the metal foil whereby the necessary weakening line is formed in the plastic without reducing the barrier properties of the laminate.

Another object of this invention is to provide a novel laminate which is suitable for use in the forming of packages with the laminate being impervious to liquids and having the required strength while at the same time being readily tearable along a predetermined line to facilitate the opening of the package, the laminate being formed of metal foil and a suitable thermodegradable material wherein the necessary tear line may be readily defined by applying heat along a concentrated line sufficient to greatly weaken the thermodegradable material while permitting the metal foil to remain intact.

With the above and other objects in view that will hereinafter appear, the nature of the invention will be more clearly understood by reference to the following detailed description, the appended claims and the several views illustrated in the accompanying drawing:

In the drawing.

FIG. 1 is a perspective view of a three-ply laminate formed in accordance with this invention and having a tear strip defined therein, portions of the laminate being broken away to show the specific details of the three plies thereof.

FIG. 2 is an enlarged fragmentary transverse sectional view taken along the line 2—2 through one of the weakening lines of the laminate and shows the specific details thereof.

FIG. 3 is a bottom perspective view of a two-ply laminate formed in accordance with this invention and having incorporated therein a tear strip.

FIG. 4 is an enlarged fragmentary sectional view taken along the line 4—4 of FIG. 3 and shows the specific details of the laminate along one of the weakening lines formed therein.

Metal foil to plastic and other inexpensive packaging materials laminates have been found to be very suitable for use in container manufacture. Such laminates are relatively inexpensive and show exceptionally good barrier properties. However, such laminates have relatively high strength and do not tear very readily. As a result, in the past they have not been suitable for use in the forming of containers due to the difficulties in opening the same.

The normal semi-rigid container is at the present time provided with a tear strip. Such a tear strip may be readily formed in paper and like container forming materials by scoring or perforating. The perforating of a laminate system would destroy the barrier properties of the laminate system. Also, to score the metal foil of the laminate would greatly reduce the barrier properties of the laminate system. In addition, even though the metal foil is scored or entirely cut through, the laminate would still tend to tear in a random manner because of the unweakened plastic or other packaging material layer.

In accordance with this invention, it is proposed to provide a metal foil to plastic or other thermodegradable packaging material laminate wherein the metal foil is in no way damaged and the laminate is weakened along the desired line of tearing by the weakening of the plastic or other thermodegradable packaging material layer. In accordance with this invention, this can be accomplished even when the plastic or other thermodegradable packaging material layer is sandwiched between two metal foil layers.

Referring now to the drawings in detail, it will be seen that there is illustrated in FIG. 1 a typical three-ply laminate formed in accordance with this invention, the laminate being generally referred to by the numeral 5. The laminate 5 includes two outer metal foil layers 6 and 7 between which there is sandwiched a plastic or other thermodegradable packaging material layer 8. It is to be understood that the metal foil layers 6 and 7 are suitably bonded to the layer 8 so as to make a relatively rigid laminate. The manner in which the metal foil is laminated to the layer 8 is in no way a part of this invention and will not be described in detail here.

At this time it is pointed out that the laminate 5 has three primary requirements. These, not necessarily in the order of their importance, are as follows:

(1) The layer 8 must be properly bonded to the metal foil layers 6 and 7.

(2) The laminate must be economically feasible for the intended use, for example in containers.

(3) The layer 8 when formed of a thermoplastic material, must fuse at a temperature below the melting point of the metal foil. When the layer 8 is formed of a material other than thermoplastic material, it must be formed of a thermodegradable material of a type wherein sufficient degradation will take place at a temperature below the melting point of the metal foil.

In accordance with this invention, the laminate 5 is provided with two weakening lines 9 and 10 which define a removable tear strip 11. It is intended that the laminate 5 have sufficient strength for the intended purpose and provide a vapor proof barrier. However, in order to facilitate the opening of a package formed from the laminate 5, it is necessary that a predetermined section thereof be removable therefrom, and it is for this reason that the tear strip 11 is provided.

It has been found that the tear strip 11 may be readily formed by effecting a scoring or otherwise weakening of the layer 8 along the weakening lines 9 and 10. This is accomplished with heat fusible plastics by taking a hot knife and pressing it firmly against the metal foil layer 6 so as to effect a fusing of the layer 8 when it is formed of a thermoplastic material or the general thermodegradation of the layer 8 when it is formed of other suitable materials. In order that there may be heat transfer through the metal foil layer 6 into the layer 8, it is necessary that the heated knife edge be firmly pressed against the metal foil layer 6 in order to ensure heat transfer. When the layer 8 is formed of a thermoplastic material and the plastic material of the plastic layer 8 is fused, the metal foil layer 6 will be deformed to a generally V configuration, at 13 in alignment with the weakening line 10, as is shown in FIG. 2. Of course, the metal foil layer 6 will also be inwardly folded along the weakening line 9, as at 12 shown in FIG. 1.

It is to be understood that in the "scoring" of the plastic layer 8, it is necessary that the knife edge utilized in this scoring operation be sufficiently hot to transfer heat through the metal foil layer 6 into the plastic layer 8 and effect a fusing of the plastic material of the plastic layer without melting the metal foil layer 6. When the layer 8 is formed of other thermodegradable materials, it is necessary that the heat transferred into the layer 8 be sufficient to effect a charring or other thermodegradation of the material. Also, while force is required to firmly place the knife edge in engagement with the metal foil layer 6, it is to be understood that the knife is not applied against the metal foil layer 6 with sufficient force to cut or tear the metal foil layer 6.

It has been found that when the laminate 5 is weakened in the manner described above, it may be readily torn along the weakening line formed therein. On the other hand, it has been found that if the metal foil layer or layers are scored or cut, and the layer 8 is not weakened, then the tearing of the laminate 5 will not necessarily be along the line of weakening of the foil layers.

A tear strip formed by the above set forth method has the following advantages:

(1) The foil layers are not damaged; therefore, the major contributor to the barrier properties of the laminate is preserved in tact.

(2) The tear strip separates from the remainder of the laminate in a smooth, uniform manner along the weakening lines defined by the passage of the hot knife edge.

(3) The torn edge of the laminate and of the tear strip are quite smooth and not likely to cause one to cut his or her hands on subsequent handling thereof.

Referring now to FIGS. 3 and 4 in particular, it will be seen that there is illustrated a modified form of laminate which is generally referred to by the numeral 15. The laminate 15 is of a two layer construction as opposed to the three layer construction of the laminate 5 and includes a metal foil layer 16 which is suitably bonded to a plastic layer 17. In other words, the laminate 15 may be identical with the laminate 5 with the exception of the omission of one of the metal foil layers.

In order to facilitate the opening of a container formed from the laminate 15, the laminate 15 is provided with a removable tear strip 18. The tear strip 18 is defined by a pair of weakening lines 19 and 20 formed in the plastic layer 17.

It will be readily apparent from FIG. 4 that the weakening lines 19 and 20 may be formed by merely applying a hot knife edge to the layer 17 along the desired line of weakening. The hot knife edge will effect a "scoring" of the layer 17 by the fusing of the material of the layer 17 touched by the hot knife edge when the material is a thermoplastic material or by the charring or other thermodegradation of other thermodegradable materials.

It will be understood that a container formed of the laminate 15 may be opened in the same manner as that described above with respect to the laminate 5. The only difference between the laminates 5 and 15 is that the laminate 5 is of a three-ply construction and includes an inner layer of metal foil as well as an outer layer of metal foil whereas the container formed from the laminate 15 includes only one layer of metal foil. Also, it will be readily apparent that since the layer 17 is exposed on one side, it is not necessary to effect the weakening of the material of the plastic layer 17 through an overlying metal foil layer. Therefore, the metal foil layer 16 is not creased or folded along the weakening lines 19 and 20.

Tests have been made with both the three-ply laminate 5 and the two-ply laminate 15 utilizing foil and plastic layer thicknesses within the commercially feasible range of packaging materials. It will be readily apparent that one of the primary restrictions is the tear strength of the laminate which is primarily governed by the thickness of the metal foil. Utilizing aluminum foil and low density polyethylene, it has been found that a two-ply laminate having a total thickness of 0.001 inch is feasible wherein the thickness of the foil and the plastic layer is 0.0005 inch. Both dead soft temper and full hard temper aluminum has been used. With the two-ply laminates, testing has been restricted to a maximum laminate thickness of 0.016 inch wherein the metal foil is formed of full hard temper aluminum having a thickness of 0.005 inch and the plastic layer is low density polyethylene having a thickness of 0.011 inch. It is obvious, however, that these are not the maximum limits for a two-ply laminate.

Limited tests have been made with three-ply laminates utilizing aluminum foil and low density polyethylene. Utilizing both dead soft temper and full hard temper aluminum foil, laminates having a thickness of 0.002 inch have proved to be successful with the foil thickness being 0.005 inch and the plastic layer thickness being 0.001 inch. Utilizing full hard temper aluminum foil having a thickness of 0.0035 inch with a plastic layer of a thickness of 0.0055 inch, a commercially feasible laminate having a thickness of 0.0125 inch has been formed. Again this latter mentioned laminate is not intended to be an example of the upper feasible limits of the laminate.

Although laminates formed of aluminum foil and low density polyethylene may at the present be the most feasible commercial laminates, the invention is not restricted to such laminates either as to the foil or the plastic layer. Numerous other thermoplastic resins could be utilized in the laminates, including polystyrene, Mylar and polyvinyl resins. Although aluminum alloys will tear readily, it is also feasible to utilize iron for the forming of the foil, particularly with the heavier thickness foils and the iron may be plain CMQ (can makers quality) black plate or black plate which has been tinplated or provided with a protective enamel coating on at least one side thereof. Also, more expensive metals, such as brass, copper, tin, etc. may be utilized. Cellophane and paper have been found to have suitable thermodegradable properties for use in accordance with this invention as materials for the forming of the thermodegradable layers.

It has been found that when the non-metallic layer of a laminate formed in accordance with this invention is formed of thermoplastic material, minute ribs are formed adjacent the score line. For example, in FIG. 4, minute ribs 21 are formed on opposite sides of the score line 20 in the thermoplastic layer 17. When the layer 8 is formed of thermoplastic material, similar ribs will be formed. These ribs facilitate the guiding of the tearing of the laminate and thus further assure the straight line tearing along the predetermined weakening line.

With respect to the two-ply laminates, when the thermodegradable layer is on the interior of a package and the package is to be utilized with reactive materials including foods, care must be made in selecting the thermodegradable material. For example, when food is to be packaged within a container formed from the two-ply laminate, the thermoplastic resins selected for use as the plastic layer should be one which does not contain a flavor affecting volatile.

It will be readily apparent that other metals and materials may be utilized in the forming of the metal foil and the non-metal layer of the laminates within the spirit and scope of the invention, as defined by the appended claims.

I claim:

1. In a laminate, a weakening line construction, said laminate being formed solely of one metal foil layer and one thermoplastic resin stiffening layer, and said thermoplastic resin layer having a weakening line molded in the surface thereof remote from said foil layer.

2. A laminate having a predetermined tear line, said laminate comprising at leaast one metal foil barrier layer and a stiffening layer of thermodegradable material, and a weakening line formed in said stiffening layer along said tear line by the thermal degradation of said stiffening layer and said thermodegradable material is cellophane.

3. A method of forming a tear line in a laminate including a stiffening layer formed of thermodegradable material comprising the steps of providing a tool having a heated edge, applying the heated edge to the laminate under pressure to effect a heating and degradation of the stiffening layer, and effecting a relative movement of said laminate and said tool along a predetermined line to form a weakening line in the stiffening layer.

4. The method of claim 3 wherein the stiffening layer is exposed and the tool is applied directly thereto.

5. A method of forming a tear line in a laminate including a stiffening layer of thermoplastic resin comprising the steps of providing a tool having a heated edge, applying the heated edge to the laminate under pressure to effect a heating and flowing of the stiffening layer, and effecting a relative movement of said laminate and said tool along a predetermined line to form a weakening line in the stiffening layer.

References Cited
UNITED STATES PATENTS

| | | | |
|---|---|---|---|
| 2,830,001 | 4/1958 | Barnes et al. | 161—119 X |
| 2,891,713 | 6/1959 | O'Neil | 229—51 TS |
| 2,213,758 | 9/1940 | Eichberg et al. | 229—51 C |
| 2,554,160 | 5/1951 | Von Gunten | 229—51 ST |
| 2,710,046 | 6/1955 | Markus et al. | 161—40 |
| 2,991,000 | 7/1961 | Spees | 229—51 AS |
| 3,186,628 | 6/1965 | Rohde | 229—51 TS |

WILLIAM A. POWELL, Primary Examiner

U.S. Cl. X.R.

156—155, 220; 161—121, 123, 214, 216, 220